United States Patent
Klassen

(10) Patent No.: US 7,826,090 B2
(45) Date of Patent: Nov. 2, 2010

(54) METHOD AND APPARATUS FOR MULTIPLE PRINTER CALIBRATION USING COMPROMISE AIM

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 755 days.

(21) Appl. No.: 11/314,774

(22) Filed: Dec. 21, 2005

(65) Prior Publication Data

US 2007/0139672 A1    Jun. 21, 2007

(51) Int. Cl.
*G06K 15/00*    (2006.01)
*G03F 3/08*    (2006.01)

(52) U.S. Cl. ......................... 358/1.9; 358/518
(58) Field of Classification Search ............... None
See application file for complete search history.

(56) References Cited

U.S. PATENT DOCUMENTS

| | | | |
|---|---|---|---|
| 4,473,298 A | 9/1984 | Sakamoto | |
| 4,516,175 A | 5/1985 | Jung et al. | |
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |
| 5,596,416 A | 1/1997 | Barry et al. | |
| 5,629,762 A | 5/1997 | Mahoney et al. | |
| 5,710,968 A | 1/1998 | Clark et al. | |
| 5,748,330 A | 5/1998 | Wang et al. | |
| 5,764,369 A * | 6/1998 | Farrell et al. ............ | 358/296 |
| 5,778,377 A | 7/1998 | Marlin et al. | |
| 5,784,667 A | 7/1998 | Mestha et al. | |
| 5,790,281 A | 8/1998 | Knox et al. | |
| 5,884,910 A | 3/1999 | Mandel | |

(Continued)

OTHER PUBLICATIONS

Ron Ellis Remote Proofing: Not Just for Big City Printers posted on or before Jul. 15, 2004.*

(Continued)

*Primary Examiner*—Twyler L Haskins
*Assistant Examiner*—Barbara D Reinier
(74) *Attorney, Agent, or Firm*—Fay Sharpe LLP

(57) ABSTRACT

A first printer is calibrated to a universal aim and the result of calibration is measured. The result of the measurement is used to produce a new aim which lies between the first printer's achieved result and the original aim. A second printer is calibrated to the new aim. Additional printers may be calibrated to aims which lie at a weighted average of a selected aim and the mean achieved behavior.

10 Claims, 4 Drawing Sheets

U.S. PATENT DOCUMENTS

| | | | |
|---|---|---|---|
| 5,995,721 A | 11/1999 | Rourke et al. | |
| 6,059,284 A | 5/2000 | Wolf et al. | |
| 6,125,248 A | 9/2000 | Moser | |
| 6,219,155 B1* | 4/2001 | Zuber | 358/1.9 |
| 6,241,242 B1 | 6/2001 | Munro | |
| 6,297,886 B1 | 10/2001 | Cornell | |
| 6,341,773 B1 | 1/2002 | Aprato et al. | |
| 6,345,117 B2 | 2/2002 | Klassen | |
| 6,381,037 B1 | 4/2002 | Balasubramanian et al. | |
| 6,384,918 B1 | 5/2002 | Hubble, III et al. | |
| 6,404,511 B1* | 6/2002 | Lin et al. | 358/1.9 |
| 6,441,923 B1 | 8/2002 | Balasubramanian et al. | |
| 6,450,711 B1 | 9/2002 | Conrow | |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,760,056 B2 | 7/2004 | Klassen et al. | |
| 6,775,029 B1 | 8/2004 | Wen et al. | |
| 6,819,906 B1 | 11/2004 | Herrmann et al. | |
| 6,925,283 B1 | 8/2005 | Mandel et al. | |
| 6,959,165 B2 | 10/2005 | Mandel et al. | |
| 7,027,187 B1* | 4/2006 | Zuber | 358/1.9 |
| 2001/0012110 A1* | 8/2001 | Kanamori | 358/1.9 |
| 2001/0033686 A1 | 10/2001 | Klassen | |
| 2002/0039110 A1* | 4/2002 | Kinumura et al. | 345/690 |
| 2002/0067849 A1 | 6/2002 | Klassen et al. | |
| 2002/0078012 A1 | 6/2002 | Ryan et al. | |
| 2002/0103559 A1 | 8/2002 | Gartstein | |
| 2002/0149799 A1* | 10/2002 | Hayashi | 358/406 |
| 2003/0063302 A1 | 4/2003 | Munger et al. | |
| 2003/0077095 A1 | 4/2003 | Conrow | |
| 2003/0164960 A1* | 9/2003 | Housel | 358/1.9 |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0136015 A1 | 7/2004 | Van de Capelle et al. | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0165199 A1 | 8/2004 | Klassen et al. | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0239935 A1* | 12/2004 | Kitazawa | 356/406 |
| 2004/0246528 A1 | 12/2004 | Washio et al. | |
| 2004/0247365 A1 | 12/2004 | Lofthus et al. | |
| 2004/0252905 A1 | 12/2004 | Mizes et al. | |
| 2004/0257595 A1 | 12/2004 | Sharma et al. | |
| 2004/0264768 A1 | 12/2004 | Sharma et al. | |
| 2004/0264769 A1 | 12/2004 | Sharma et al. | |
| 2004/0264770 A1 | 12/2004 | Sharma et al. | |
| 2004/0264771 A1 | 12/2004 | Sharma et al. | |
| 2005/0036159 A1 | 2/2005 | Sharma et al. | |
| 2005/0254077 A1* | 11/2005 | Kinumura et al. | 358/1.9 |
| 2005/0280852 A1* | 12/2005 | Namizuka | 358/1.9 |

OTHER PUBLICATIONS

Keith Knox, "Integrating Cavity Effect in Scanners," Proceedings on IS&T/OSA Conference on Optics and Imaging in the Information Age, Rochester, pp. 156-158 (1996).
G. Sharma, S. Wang, D. Sidavanahalli and K. Knox, "The Impact of UCR on Scanner Calibration," in Proc PICS Conf., pp. 121-124, Portland, OR (1998).
U.S. Appl. No. 10/945,600, filed Sep. 20, 2004, Yao.
U.S. Appl. No. 11/268,294, filed Nov. 4, 2005, Klassen.
U.S. Appl. No. 11/274,638, filed Nov. 15, 2005, Wu et al.
U.S. Appl. No. 11/287,177, filed Nov. 23, 2005, Mandel et al.
U.S. Appl. No. 11/291,860, filed Nov. 30, 2005, Willis.
U.S. Appl. No. 11/292,163, filed Nov. 30, 2005, Mandel et al.
U.S. Appl. No. 11/292,388, filed Nov. 30, 2005, Mueller.
U.S. Appl. No. 11/314,774, filed Dec. 21, 2005, Klassen.
U.S. Appl. No. 11/315,045, filed Dec. 22, 2005, Klassen.
V. Ostromoukhov, R.D. Hersch, C. Peraire, P. Emmel and I. Amidror, "Two Approaches in Scanner-Printer Calibration: Colorimetric Space-Based vs. Closed-Loop," in Proc SPIE 2170, pp. 133-142 (1994).
J. Hardeberg, "Desktop Scanning to sRGB," in IS&T and SPIE's Device Independent Color, Color Hardcopy and Graphic Arts V, San Jose, CA (Jan. 2000).
U.S. Appl. No. 11/170,975, filed Jun. 30, 2005, Klassen.
H. Haneishi, T. Hirao, A. Shimazu and Y. Miyake, "Colorimetric Precision in Scanner Calibration Using Matrices," in Proceedings of IS&T and SID'S $3^{rd}$ Color Imaging Conference: Color Science, Systems and Applications, pp. 106-108, Scottsdale, Arizona (Nov. 1995).
A.R. Rao, "Color Calibration of a Colorimetric Scanner Using Non-Linear Least Squares," in Proc. IS&T's 1998 Pics Conference, Portland, OR (May 1998).
U.S. Appl. No. 11/136,821, filed May 25, 2005, Robinson.
U.S. Appl. No. 11/170,873, filed Jun. 30, 2005, Klassen.
J. Hardeberg, "Acquisition and Reproduction of Colour Images: Colorimetric and Multispectral Approaches," Doctoral Dissertation, l'Ecole Nationale Superieure des Telecommunications, Paris (1999).
Morgan, P.F., "Integration of Black Only and Color Printers", Xerox Disclosure Journal, vol. 16, No. 6, Nov./Dec. 1991, pp. 381-383.
Desmond Fretz, "Cluster Printing Solution Announced", Today at Xerox (TAX), No. 1129, Aug. 3, 2001.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.

U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/137,273, filed May 25, 2005, Anderson et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/212,367, filed Aug. 26, 2005, Anderson et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/235,979, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/236,099, filed Sep. 27, 2005, Anderson et al.

* cited by examiner

FIG. 4A
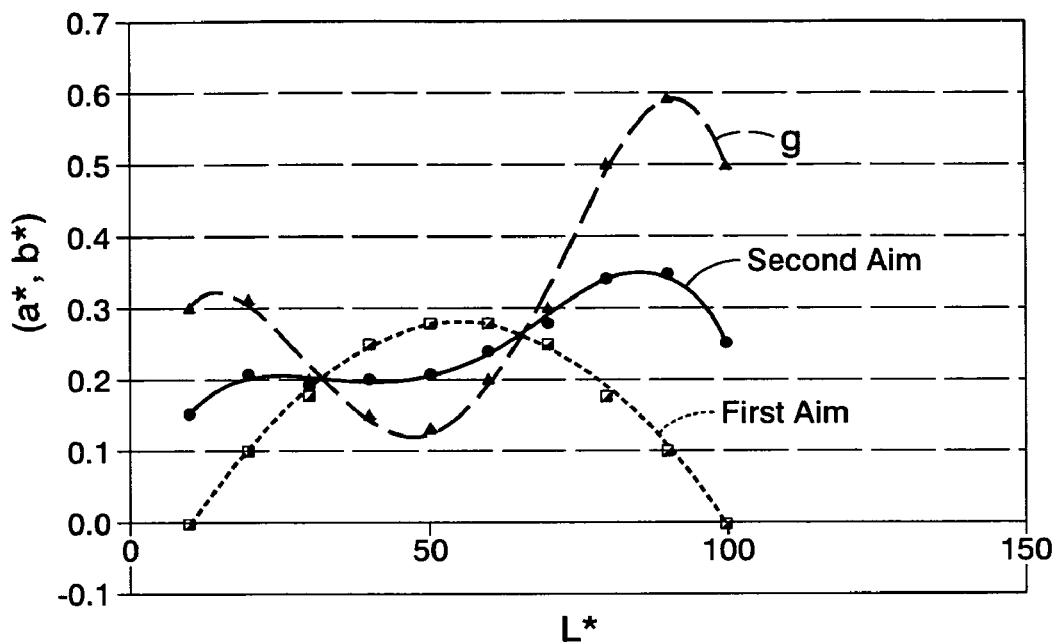
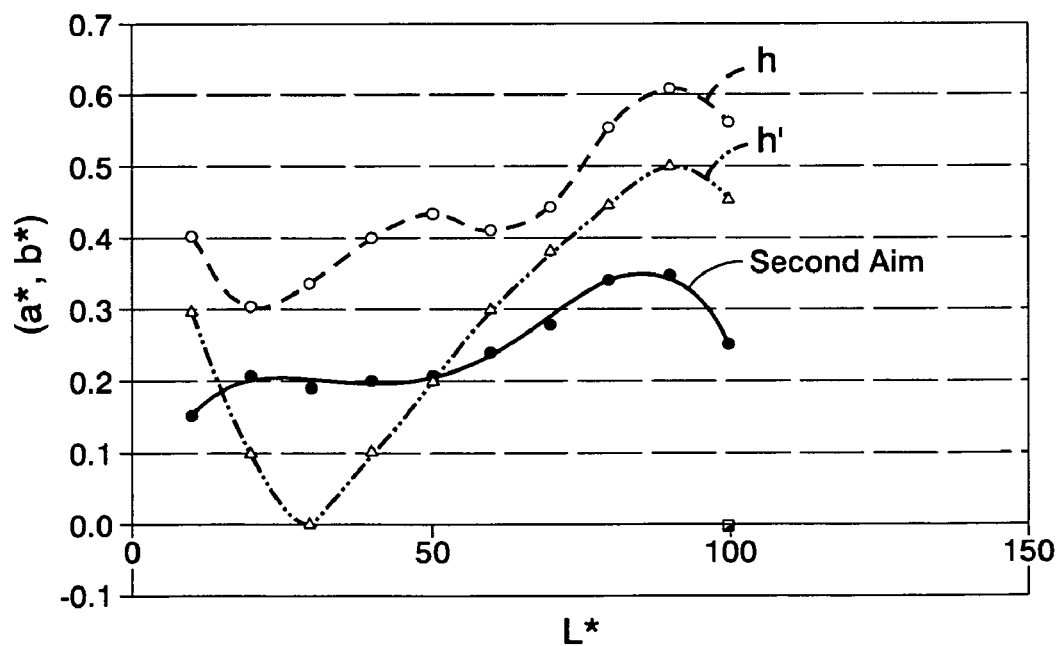
FIG. 4B

METHOD AND APPARATUS FOR MULTIPLE PRINTER CALIBRATION USING COMPROMISE AIM

BACKGROUND

By way of background, in situations where a number of printers are configured in a network or otherwise are expected to perform to a uniform level, calibration of these printers is typically necessary. In this regard, standard practice is to calibrate printers to a common aim. In the printing environment, the common or desired aim is a value or a set of values that can be measured and represents a desired response of the printer or printers that are subject to the calibration. This is also referred to as a fleet aim.

As with any physical process, however, the ability to reach the desired aim through calibration is imperfect. This imperfection and divergence may well occur no matter the calibration technique used. By chance, two printers may diverge from the desired aim in the same direction. This makes the printers appear to look more alike, e.g. respond in uniform manners; however, it does not result in printers achieving the desired aim. That which is more likely is that the printers in a group or fleet, even if calibrated using the same calibration technique to achieve the desired aim, will diverge in different directions. This, of course, makes them, on average, more different from each other than from the common aim.

As one alternative for calibration, calibrating one of the printers to the achieved response of the other printer can be accomplished. However, while some uniformity may result, this will also result in a lack of desired uniformity and a larger-than-needed error from the common aim.

As a further alternative, an average of the responses of the printers in the fleet can be calculated. All of the printers can then simply be calibrated to the average. However, the response of any one of the printers might not be achievable to obtain the average. That is, the inherent physical characteristics of the printer or the environment may prevent the printer from achieving the average in any circumstances. To illustrate, with reference to FIG. 1, an average response of a series of printers may be graphed in a L*a*b* color space as shown. A desired aim is also illustrated. As one can see, the average response is actually more difficult to achieve for a printer "n" than the aim. Indeed, the average response may be impossible to attain for the printer "n". Again, this will result in a lack of desired uniformity and a larger-than-needed error from the common aim

CROSS REFERENCE TO RELATED PATENTS AND APPLICATIONS

This application is related to U.S. application Ser. No. 11/170,873, filed Jun. 30, 2005, entitled "Color Characterization or Calibration Targets with Noise-Dependent Patch Size or Number," by R. Victor Klassen; U.S. application Ser. No. 11/170,975, filed Jun. 30, 2005, entitled "Method and System for Processing Scanned Patches for Use in Imaging Device Calibration," by R. Victor Klassen; U.S. application Ser. No. 11/268,294, filed Nov. 4, 2005, entitled "A Method for Correcting Integrating Cavity Effect for Calibration and/or Characterization Targets,", by R. Victor Klassen; and, U.S. Application No. 60/733,467, filed Nov. 4, 2005, entitled "Scanner Characterization for Printer Calibration," by R. Victor Klassen, all of which are incorporated herein by reference.

The following applications, the disclosures of each being totally incorporated herein by reference, are mentioned:

Application Ser. No. 11/212,367, filed Aug. 26, 2005, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

Application Ser. No. 11/235,979, filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE", and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

Application Ser. No. 11/236,099, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING SYSTEM WITH MULTIPLE OPERATIONS FOR FINAL APPEARANCE AND PERMANENCE", and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

(XERZ 2 00740-Category 5) U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/000,168, filed Nov. 30, 2004, entitled "ADDRESSABLE FUSING AND HEATING METHODS AND APPARATUS," by David K. Biegelsen, et al.;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/090,502, filed Mar. 25, 2005, entitled "IMAGE QUALITY CONTROL METHOD AND APPARATUS FOR MULTIPLE MARKING ENGINE SYSTEMS," by Michael C. Mongeon;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/109,558, filed Apr. 19, 2005, entitled "SYSTEMS AND METHODS FOR REDUCING IMAGE REGISTRATION ERRORS," by Michael R. Furst, et al.;

U.S. application Ser. No. 11/109,996, filed Apr. 20, 2005, entitled "PRINTING SYSTEMS," by Michael C. Mongeon, et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/143,818, filed Jun. 2, 2005, entitled "INTER-SEPARATION DECORRELATOR," by Edul N. Dalal, et al.;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/189,371, filed Jul. 26, 2005, entitled "PRINTING SYSTEM," by Steven R. Moore, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS", by Goodman, et al.;

U.S. application Ser. No. 11/234,553, filed Sep. 23, 2005, entitled "MAXIMUM GAMUT STRATEGY FOR THE PRINTING SYSTEMS", by Michael C. Mongeon;

U.S. application Ser. No. 11/234,468, filed Sep. 23, 2005, entitled "PRINTING SYSTEM", by Eric Hamby, et al.;

U.S. application Ser. No. 11/247,778, filed Oct. 11, 2005, entitled "PRINTING SYSTEM WITH BALANCED CONSUMABLE USAGE", by Charles Radulski, et al.;

U.S. application Ser. No. 11/274,638, filed Nov. 15, 2005, entitled "GAMUT SELECTION IN MULTI-ENGINE SYSTEMS", by Wencheng Wu, et al.;

U.S. application Ser. No. 11/287,177, filed Nov. 23, 2005, entitled "MEDIA PASS THROUGH MODE FOR MULTI-ENGINE SYSTEM", by Barry P. Mandel, et al.;

U.S. application Ser. No. 11/287,860, filed Nov. 30, 2005, entitled "MEDIA PATH CROSSOVER CLEARANCE FOR PRINTING SYSTEM", by Keith L. Willis;

U.S. application Ser. No. 11/292,388, filed Nov. 30, 2005, entitled "PRINTING SYSTEM", by David A. Mueller; and, U.S. application Ser. No. 11/292,163, filed Nov. 30, 2005, entitled "RADIAL MERGE MODULE FOR PRINTING SYSTEM", by Barry P. Mandel, et al.

INCORPORATION BY REFERENCE

U.S. application Ser. No. 11/170,873, filed Jun. 30, 2005, entitled "Color Characterization or Calibration Targets with Noise-Dependent Patch Size or Number," by R. Victor Klassen; U.S. application Ser. No. 11/170,975, filed Jun. 30, 2005, entitled "Method and System for Processing Scanned Patches for Use in Imaging Device Calibration," by R. Victor Klassen; U.S. application Ser. No. 11/268,294, filed Nov. 4, 2005, entitled "A Method for Correcting Integrating Cavity Effect for Calibration and/or Characterization Targets,", by R. Victor Klassen; and, U.S. Application No. 60/733,467, filed Nov. 4, 2005, entitled "Scanner Characterization for Printer Calibration," by R. Victor Klassen, are all incorporated herein by reference in their entirety.

BRIEF DESCRIPTION

According to one aspect of the presently described embodiments, a method for calibrating a plurality of printers comprises calibrating a first printer of the plurality of printers using a first aim, measuring results achieved by the first printer, calculating a second aim based on the measuring and the first aim and calibrating a second printer of the plurality of printers using the second aim.

According to another aspect of the presently described embodiments, the measuring comprises scanning.

According to another aspect of the presently described embodiments, the measuring comprises using a spectrophotometer.

According to another aspect of the presently described embodiments, the method wherein calculating the second aim comprises calculating a weighted average of the results achieved by the first printer and the first aim.

According to another aspect of the presently described embodiments, the method further comprises measuring results achieved by the second printer, calculating a third aim based on the measuring of the results achieved by the second printer and the second aim and calibrating a third printer of the plurality of printers using the third aim.

According to another aspect of the presently described embodiments, the measuring comprises scanning.

According to another aspect of the presently described embodiments, the measuring comprises using a spectrophotometer.

According to another aspect of the presently described embodiments, the method wherein calculating the third aim comprises calculating a weighted average of the results achieved by the second printer and the second aim.

According to another aspect of the presently described embodiments, the method further comprises calibrating a third printer of the plurality of printers using the second aim point.

According to another aspect of the presently described embodiments, a system comprises a plurality of printers, a network print controller, and a measuring device, wherein the measuring device is operative to measure results achieved by selected printers of the plurality of printers, and further wherein the network print controller is operative to calibrate a first printer of the plurality of printers using a first aim, calculate a second aim based on results for the first printer measured by the measuring device and the first aim, and calibrate a second printer of the plurality of printers using the second aim.

According to another aspect of the presently described embodiments, the measuring device is a scanner.

According to another aspect of the presently described embodiments, the measuring device comprises a spectrophotometer.

According to another aspect of the presently described embodiments, the network print controller is operative to calculate the second aim based on a weighted average of the results achieved by the first printer and the first aim.

According to another aspect of the presently described embodiments, the measuring device is operative to measure results achieved by the second printer and the network print controller is operative to calculate a third aim based on the results achieved by the second printer and the second aim and calibrate a third printer of the plurality of printers using the third aim.

According to another aspect of the presently described embodiments, the network print controller is operative to calculate the third aim based on a weighted average of the results achieved by the second printer and the second aim.

According to another aspect of the presently described embodiments, the network print controller is operative to calibrate a third printer of the plurality of printers using the second aim.

BRIEF DESCRIPTION OF THE DRAWINGS

FIGS. 4(a) and (b) are graphs illustrating the presently described embodiments; and, FIG. 5 is a flow chart illustrating a method according to the presently described embodiments.

DETAILED DESCRIPTION

As discussed above, a customer currently has no practical way of achieving machine-to-machine consistency beyond that provided by calibrating both machines to the same aim or by calibrating the printers to one another or an average response of a selected group of similarly situated printers. As further noted, these approaches are oftentimes ineffective.

Along these lines, each machine has a typical noise response with standard deviation about its own mean of $\sigma$. Then, on average, any given machine pair will differ from each other by $\sigma\sqrt{2}$. Similarly, if a customer were able to measure the response of the first machine calibrated perfectly, and then calibrate a second machine to match the first, the two machines would still likely differ from each other. A fleet of such pairs would have a distribution of printer-to-printer differences characterized by $\sigma$. However, the second printer of each pair would now differ from the desired aim by $\sigma\sqrt{2}$.

Moreover, measurements of the response of the first machine are not perfect, so the aim for the second printer would have some additional error introduced, and it would in fact differ from the original aim by more than $\sigma\sqrt{2}$.

To overcome the difficulties with calibration techniques outlined above, the presently described embodiments are directed to a technique that initially involves determining a first aim point and calibrating one printer to that aim point. The response of the first printer is then measured. Using a weighted average of that measured response and the original aim as a new aim, a second printer may then be calibrated to that new aim. Additional printers may also be similarly calibrated according to the presently described embodiments.

That is, the presently described embodiments are related to a technique whereby a first printer is calibrated to a first or universal aim, the first printer is enabled to print and the result of calibration is measured. The result of the measurement is used to produce a new or second aim which lies between the first printer's achieved result and the original or first aim. A second printer is then calibrated to the new or second aim. Additional printers may be calibrated to aims which lie at a weighted average of a selected aim and the mean achieved behavior. If at least one printer is known to have a smaller gamut, that printer is used as the first printer.

Figure 2:
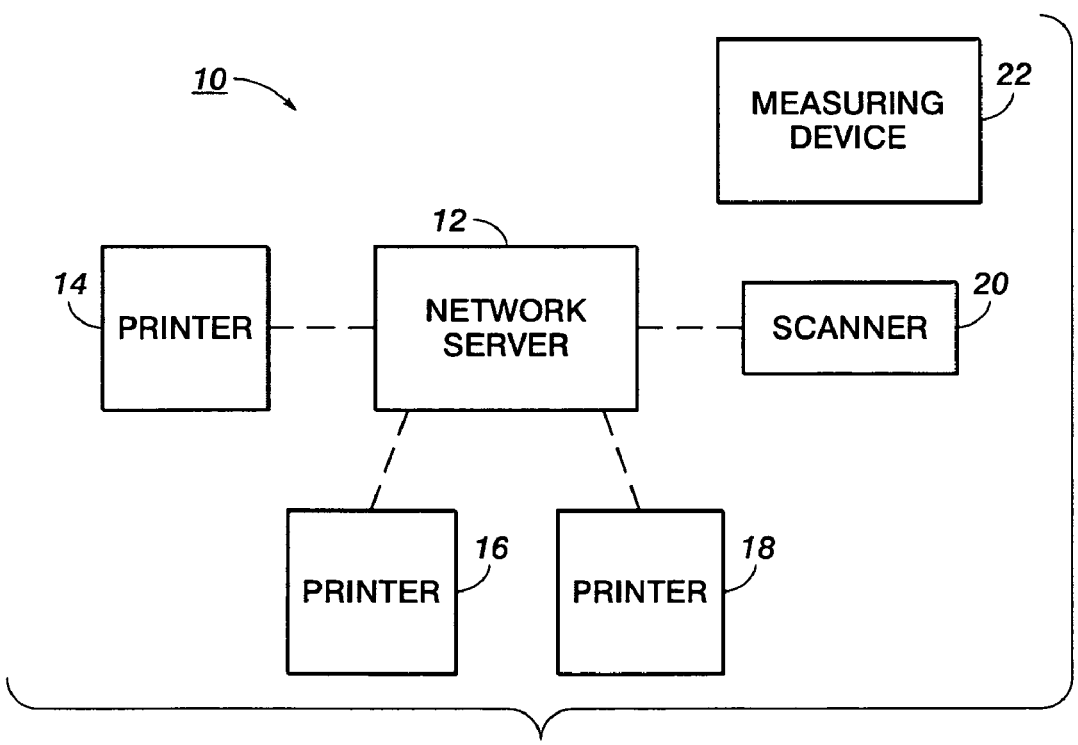
FIG. 2 is a system into which the presently described embodiments may be incorporated.

Referring now to FIG. 2, a system 10 is shown. The system 10 includes a network server or network print controller 12 and printers 14, 16 and 18. The system 10 may also include a scanner 20 or a measuring device 22, such as a spectrophotometer, each of which are useful for measuring the response (or the printed output) of the printers 14, 16, or 18. It will be appreciated that the system 10 is merely provided as an example of a system to which the teachings of the presently described embodiments may be applied. Other variations of such systems will be apparent to those of skill in the art. In at least one form, however, a common scanner 20 or measuring device 22 is used in the calibration process contemplated herein. The network server or print controller 12 may take a variety of suitable forms.

According to the presently described embodiments, a first printer, e.g. printer 14, of the plurality of printers 14, 16, and 18 may be calibrated using a first aim point. It should be understood that the first aim point may be a value or set of values representing a desired response of the printer fleet. These values may take a variety of forms and represent a variety of different aspects of the printing process as a function of the objectives of the application. These aim values may be calculated or may be based on empirical data.

It should be appreciated that the printer 14 may be calculated using any suitable calibration technique. The presently described embodiments are not limited to application of any one particular calibration method.

The printer 14 is then enabled to print to achieve a response. The response is the measured, using the scanner 20 or the measuring device 22. A second aim point is calculated based on the measured response and the first aim point. A second printer, such as printer 16, may then be calibrated using the second aim point.

In at least one form of the presently described embodiments, the second printer 16 may then be enabled to print and its response may be measured by the scanner 20 or the measuring device 22. A third aim point may be determined based on the measured results of the second printer 16 and the second aim point. A third printer such as printer 18 may then be calibrated using the third aim point.

Of course, it will be understood that this approach may simply be repeated for all other printers for which calibration is sought. In at least one form, however, a common scanner or measuring device is used for all printers.

In another form of the presently described embodiments, the third printer 18, and any other subsequently calibrated printers, may be calibrated using the second aim point. Such an approach will have particular application where processing time is sought to be reduced.

Figure 3:
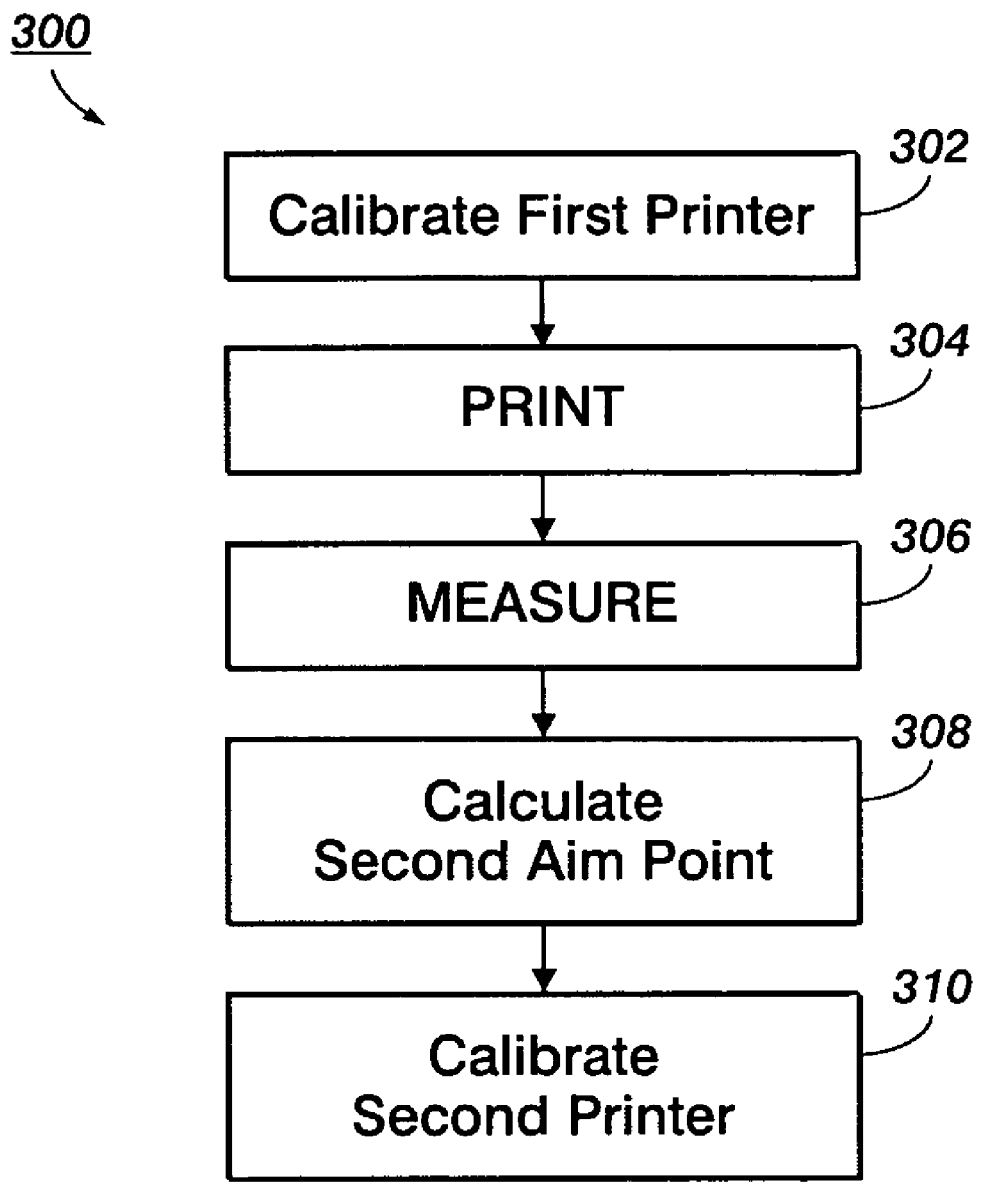
FIG. 3 is a flow chart illustrating a method according to the presently described embodiments.

With reference now to FIG. 3, a flow chart illustrating a method(s) according to the presently described embodiments is illustrated. It should be understood that such method(s) may be implemented in a variety of manners. In this regard, the method(s) may be implemented in software routines, hardware configurations, or combinations of both. For example, the method(s) may be implemented in software routines that reside on and are executed by the network server 12 (of FIG. 2). Of course, the network server 12 in this example would suitably communicate with the printers 14, 16 and 18, as well as the scanner 20 and/or the measuring device 22, in order to achieve the objectives of the presently described embodiments. Therefore, suitable portions of the software routines enlisted to implement the presently described embodiments may be housed on these, as well as other, devices in the system.

As shown, a method 300 involves first calibrating a first printer, such as printer 14 of FIG. 2 (at 302). This calibration is based on a desired, universal or first aim point. As noted, any suitable calibration technique may be used. As those of skill in the art will appreciate, a variety of calibration techniques which can be implemented to then elicit a measurable printer response are available. The first printer, e.g. printer 14, is then used to print a sample (at 304). This sample may take a variety of forms. In at least one form, however, the sample takes the form of a test patch or test pattern that is advantageously designed to be conducive to a calibration process.

Next, the printed results achieved by the first printer are measured (at 306). Any suitable technique to measure print or color values may be implemented. However, in the example of FIG. 2, the measurement would be accomplished using the scanner 20 or the measuring device 22. This set of values (or single value) is then stored or otherwise made available for further processing in accord with the presently described embodiments.

A second, or modified, aim point is then calculated, e.g. by the network server 12 as will be described in connection with FIG. 4, based on the measured values and the first aim point (at 308). A second printer of the plurality of printers or fleet is then calibrated using the second aim point (at 310).

Referring now to FIGS. 4(a) and (b), graphs illustrating the method(s) of FIG. 3 are shown. An aim curve normally maps from L* to (a*,b*) pairs. That is, it is a space curve, travelling from L*=0 to L*=100, and for each value of L* it specifies a location in (a*,b*). A single aim curve projected onto the L*a* plane is shown, for ease of reference.

With reference to FIG. 4(a), the response of a printer g is graphed in color space (as denoted by the solid triangle datapoints). Also shown in FIG. 4(a) is a set of values representing a first aim of a calibration technique (denoted by solid squares datapoints). If the printer g is subjected to a suitable calibration method to achieve the first aim, the response of the printer g is measured and plotted as shown. Note that the printer response does not exactly replicate the first aim because no calibration process is perfect in implementation.

According to the presently described embodiments, the printer response and the first aim may be manipulated to calculate a weighted average. As shown in FIG. 4(a), the weighted average of the printer response g and the first aim may be represented by the line of solid circles. As can be seen, the weighting factor is one half (½). The weighted average, which may vary based upon the objectives of the calibration techniques and the person implementing the calibration, is a second aim (denoted by the solid circles in FIG. 4(a)). The calculation of the second aim can be accomplished in a variety of suitable manners. As shown in FIG. 4(b), a printer h, which uncalibrated response is shown by hollow circles, can be calibrated to achieve the second aim shown by solid circles. As shown, after calibration, the printer h exhibits a response h', shown by hollow triangles.

As can be seen by the example illustrated in FIGS. 4(a) and (b), the printer calibration technique according to the presently described embodiments involves the calculation of a first aim set of values, calibration of a first printer to achieve those values, and a calculation of a second aim set of values based on a weighted average of the first aim and the printer response after calibration. The new aim can then be used to calibrate a second printer. The result is an improved calibration whereby the printers being calibrated are calibrated towards desired sets of values (e.g., the first aim and the second aim). This technique also allows for calibration of a plurality of printers to achieve uniformity among the printers. So, a balance is struck between uniformity among printers and the ultimate goal of achieving certain aim values.

If the calibration involves perfect algorithms (and for some forms of printer calibration the algorithms have very small errors), the calibration will still have errors introduced by the printer noise and measurement noise. This means, that prior to measurement, it will differ from its true mean native response by an error vector whose length can be characterized (for a population of such measurements) as having a mean, and standard deviation $\sigma$. The calibration assumes the printer behaves as measured and will bring it exactly to the aim. However, the printer it brought to the aim is only within $\pm 2\sigma$ of the true mean response 95% of the time. This is then measured and due to measurement noise and printer noise, it determines how the printer is actually behaving, but again only to within $\mu \pm 2\sigma$ of the true behavior 95% of the time.

Finally, the second printer will only achieve this aim to within $\mu \pm 2\sigma$ of the true behavior 95% of the time.

In a simulation, involving realistic printer error distributions, where each printer/measurement had a mean delta E of 1.0, three cases were considered. In the one extreme case, the two printers had a common aim: the $95^{th}$ percentile error between each printer and the common aim was approximately 2.3, while the inter-printer difference was 3.4. At the other extreme, the second printer's aim was the first printer's achieved value. The $95^{th}$ percentile error between the two printers was 2.3 while the second printer's $95^{th}$ percentile error from the aim of the first printer was 3.4. When the second printer's aim was made to be half way between the first printer's aim and its achieved values, its $95^{th}$ percentile error was approximately 2.9 (from both the first printer's achieved value and the first printer's aim). In reality, it is not unlikely that the two printers will be incapable of reaching the same set of colors. In that case, the common aim should first be set to an achievable (by both) set of colors.

Usually, for printer calibration, the difficulty lies in one printer having a lower $D_{max}$ than the other, and at least for a given separation, one printer has the weaker gamut. A more complicated case would be one in which one had the weaker gamut for part of color space, while the other had the weaker gamut for another part. In this case, the gamut may be split in a region both printers can achieve, and the two portions handled separately.

Given the usual case, in which the issue is only a reduced $D_{max}$ for one printer, the printer having the lower $D_{max}$ should be calibrated first, using an aim based on its $D_{max}$. Then, the achieved response would be computed and a new aim would be computed as a linear combination of the aim used to calibrate the first printer and the achieved response of the first printer. The parameter controlling the fraction of the original response and the fraction of the achieved response used could be fixed (e.g. at 0.5) or could be user-settable, based on the relative importance of achieving the absolute aim vs. achieving inter-printer consistency.

In a larger-than-two set of printers, any linear combination of the original aim and the various achieved responses for the first n printers could be used when calibrating printer n+1. The most likely choice would be to weight all of the printers equally, and then allow the user the freedom to change the relative importance of the original aim and the mean response when computing the aim for printer n+1.

Figure 1:
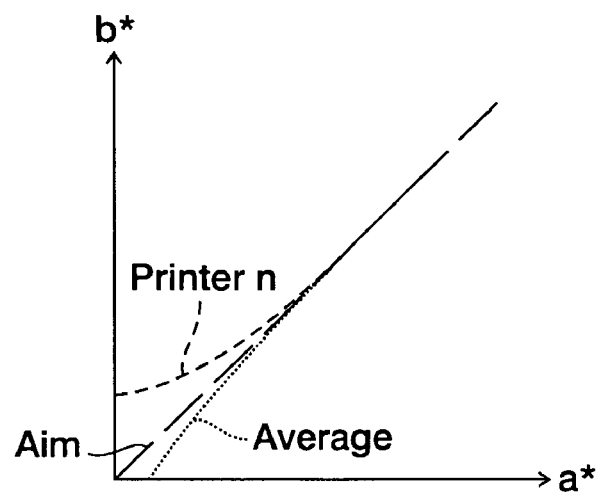
FIG. 1 is a graph illustrating typical printer responses.
Figure 5:
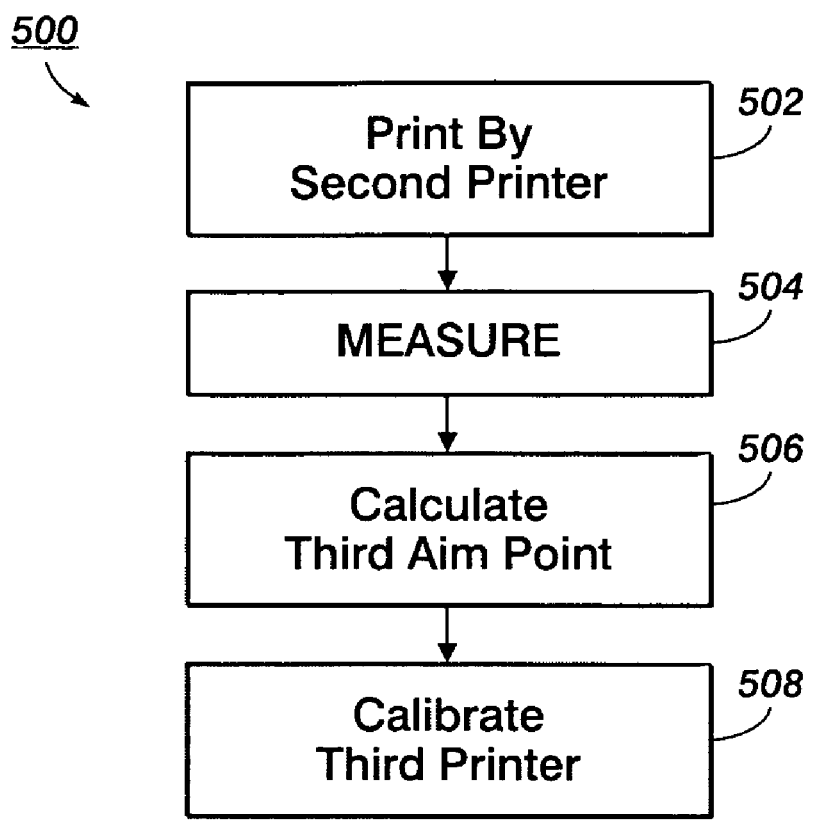

In this regard, with reference to FIG. 5, a method 500 is illustrated. It will be appreciated the method 500 supplements the method 300 of FIG. 3. Like the method 300, the method 500 may be implemented in software routines, hardware configurations, or combinations of both. For example, the method(s) may be implemented in software routines that reside on and are executed by the network server 12 (of FIG. 1). Of course, the network server 12 in this example would suitably communicate with the printers 14, 16 and 18, as well as the scanner 20 and/or the measuring device 22, in order to achieve the objectives of the presently described embodiments.

As shown, the method 500 is initiated by allowing the second calibrated printer to print a sample (at 502). Again, this sample may take a variety of forms. In at least one form, however, the sample takes the form of a test patch or test pattern that is advantageously designed to be conducive to a calibration process.

Next, the printed results achieved by the second printer are measured (at 504). Any suitable technique to measure print or color values may be implemented. However, in the example of FIG. 1, the measurement would be accomplished using the scanner 20 or the measuring device 22. A1

A third, or further modified, aim point is then calculated, e.g. by the network server 12 in a fashion similar to that described in connection with FIGS. 4(*a*) and (*b*), based on the measured values and the second aim point (at 506). A third printer of the plurality of printers or fleet is then calibrated using the third aim point (at 508).

Of course, further printers, e.g. up to n-printers, may be calibrated using this process. It will be understood that modifying the aim point for each iteration will result in converging values. This results in an effective calibration process.

As an alternative, a third printer may be calibrated by simply using the second aim point that was calculated. This may also be applied to subsequent printer calibrations. This technique may be desired in situations where the objective is to reduce processing.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for calibrating a plurality of printers, the plurality being associated with an aim, the method comprising:
    calibrating a first printer of the plurality of printers using a first aim;
    measuring results achieved by the first printer;
    calculating a second aim based on the measuring and the first aim;
    calibrating a second printer of the plurality of printers using the second aim;
    measuring results achieved by the second printer;
    calculating a third aim based on the measuring the results achieved by the second printer and the second aim; and,
    calibrating a third printer of the plurality of printers using the third aim.

2. The method as set forth in claim 1 wherein the measuring comprises scanning.

3. The method as set forth in claim 1 wherein the measuring comprises using a spectrophotometer.

4. The method as set forth in claim 1 wherein calculating the second aim comprises calculating a weighted average of the first aim and the results achieved by the first printer.

5. The method as set forth in claim 1 wherein calculating the third aim comprises calculating a weighted average of the second aim and the results achieved by the second printer.

6. A system comprising:
    a plurality of printers;
    a network print controller; and,
    a measuring device,
    wherein the measuring device is operative to measure results achieved by selected printers of the plurality of printers,
    and further wherein the network print controller is operative to calibrate a first printer of the plurality of printers using a first aim, calculate a second aim based on results for the first printer measured by the measuring device and the first aim, calibrate a second printer of the plurality of printers using the second aim, calculate a third aim based on the results for the second printer measured by the measuring device and the second aim, and calibrate a third printer of the plurality of printers using the third aim.

7. The system as set forth in claim 6 wherein the measuring device is a scanner.

8. The system as set forth in claim 6 wherein the measuring device comprises a spectrophotometer.

9. The system as set forth in claim 6 wherein the network print controller is operative to calculate the second aim based on a weighted average of the results achieved by the first printer and the first aim.

10. The system as set forth in claim 6 wherein the network controller is operative to calculate the third aim based on a weighted average of the results achieved by the second printer and the second aim.

* * * * *